H. K. HODGEBOOM.
VEHICLE INDICATOR.
APPLICATION FILED MAR. 26, 1914.
1,142,038.
Patented June 8, 1915.
2 SHEETS—SHEET 1.
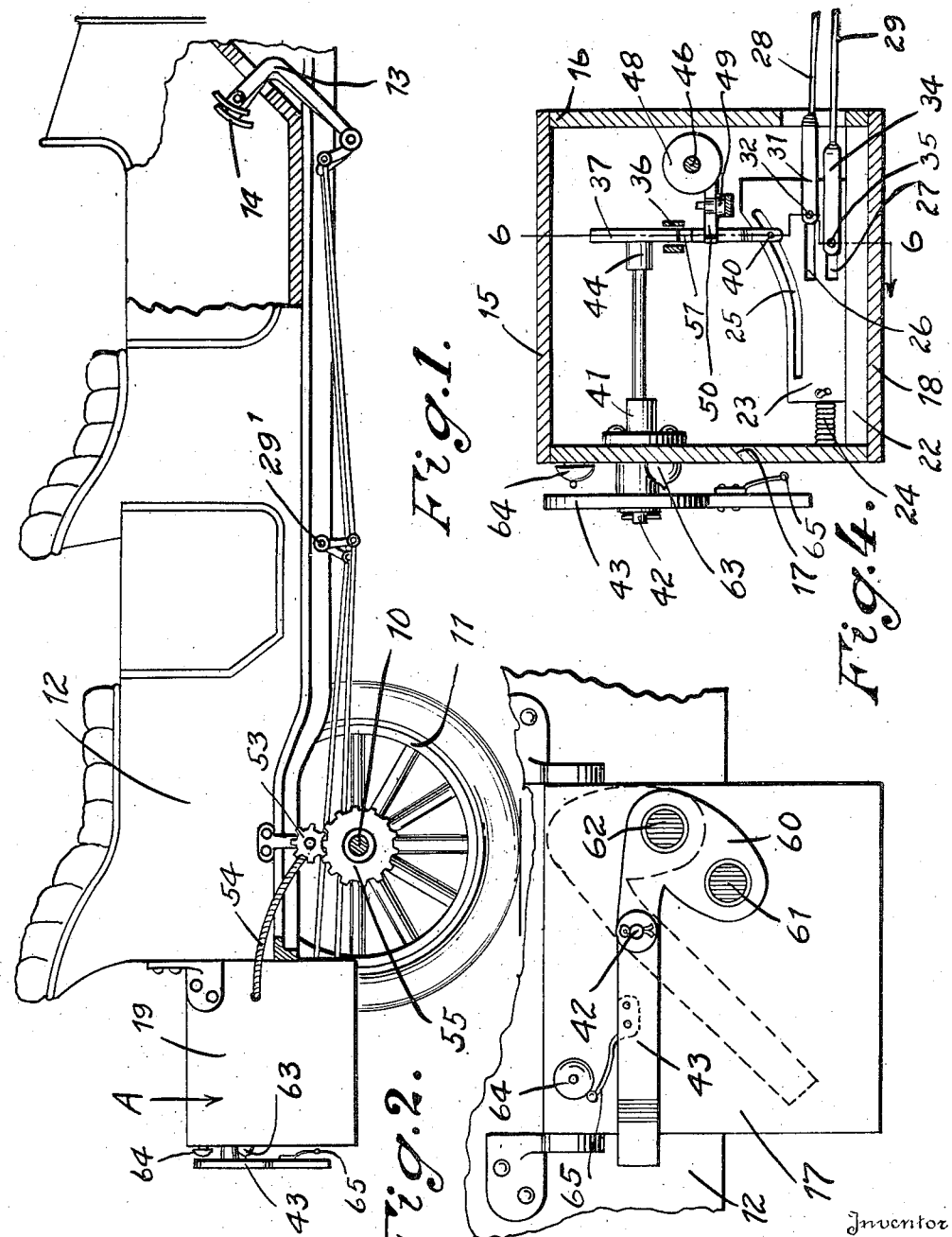
Witnesses
M. S. Watson
Henry T. Bright
Inventor
H. K. Hodgeboom
By Chandler Chandler
Attorneys

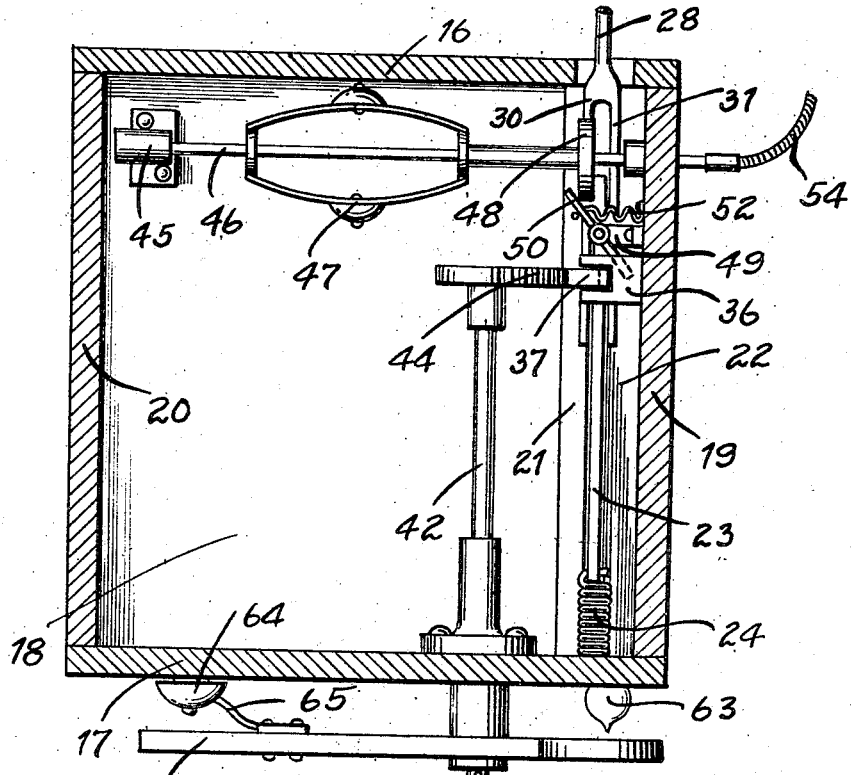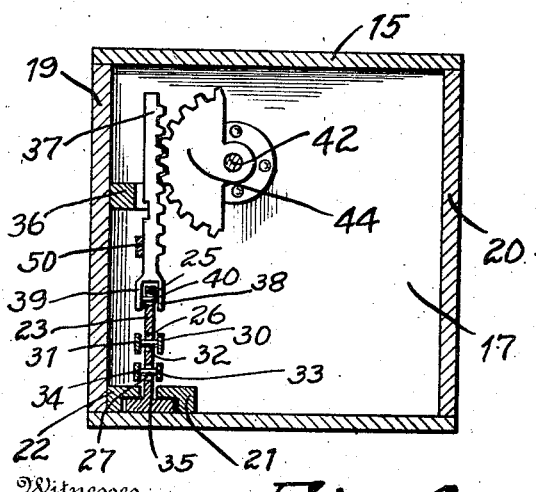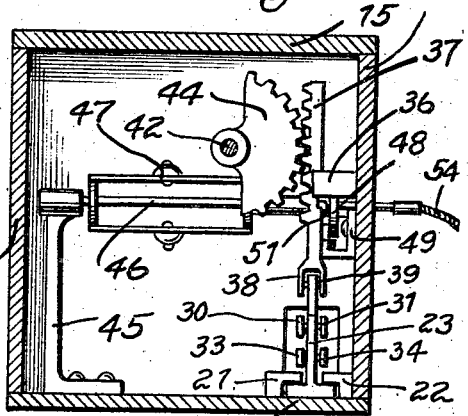

UNITED STATES PATENT OFFICE.

HARRY K. HODGEBOOM, OF MONTROSE, NEW YORK.

VEHICLE-INDICATOR.

1,142,038.   Specification of Letters Patent.   Patented June 8, 1915.

Application filed March 26, 1914.   Serial No. 827,437.

*To all whom it may concern:*

Be it known that I, HARRY K. HODGEBOOM, a citizen of the United States, residing at Montrose, in the county of Westchester, State of New York, have invented certain new and useful Improvements in Vehicle-Indicators; and I do hereby declare the following to be a full, clear, and exact description of the invention, such as will enable others skilled in the art to which it appertains to make and use the same.

This invention relates to vehicle indicators and particularly to an indicator for signaling that an automobile is to stop.

The object of the invention resides in the provision of a device of the character named in which the application of the brakes through the medium of the regular brake lever or the emergency brake lever will set the indicating element of the device to indicate that the automobile is stopping and thus warn vehicles in the rear in time to prevent possible collision and resulting accident.

A further object of the invention resides in the provision of a device of the character named which in addition to operating a signal arm to indicate that the automobile is stopping will also simultaneously ring a bell to indicate the same condition.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1 is a side view of a fragment of an automobile showing the improved indicator applied and also the connections between the indicator and the regular and emergency brake levers; Fig. 2, a rear view of the device showing the signaling arm in full lines in danger position and in dotted lines in normal position; Fig. 3, a plan view of the device on an enlarged scale with the casing in section; Fig. 4, a side view of the device with the casing in section; Fig. 5, a front view of the device with the casing in section, and Fig. 6, a section on the line 6—6 of Fig. 4.

Referring to the drawings 10 indicates the rear axle of an automobile, 11 one of the rear wheels, 12 the body of the automobile, and 13 and 14 the regular and emergency brake levers respectively.

The device proper is shown as comprising a casing A which is secured in any desired manner to the rear of the body 12. This casing A includes a top member 15, a front member 16, a rear member 17, a bottom member 18, and side members 19 and 20. Mounted upon the bottom member 18 are spaced ribs 21 and 22 which run longitudinally of the automobile. Slidably mounted between the ribs 21 and 22 is a plate 23 which is normally held in its rearmost position by means of a spring 24 one end of which is secured to the plate 23 and the other end to the rear member 17. This plate A is provided with an inclined slot 25 adjacent its upper edge and also with horizontal slots 26 and 27 disposed beneath the slot 25. Slidably engaged through the front member 16 are rods 28 and 29 which are pivotally connected at their forward ends to respective brake shafts 29'. The rear end of the rod 28 is forked to form arms 30 and 31 which are disposed in embracing relation to the plate 23. Journaled between the arms 30 and 31 is a roller 32 which extends through the slot 26. The rear end of the rod 29 is likewise forked to form arms 33 and 34 which are disposed in embracing relation to the plate 23. Journaled between the arms 33 and 34 is a roller 35 which is engaged through the slot 27. By this construction it will be apparent that when either of the brake levers 13 and 14 is operated to apply the brake one or the other of the rods 28 and 29 will be moved longitudinally and during this movement of such rod one or the other of the rollers 32 and 35 will engage the forward wall of one or the other of the slots 26 and 27 and move the plate 23 forwardly against the influence of the spring 24.

Slidably mounted in a bracket 36 carried by the side member 20 is a rack bar 37, the lower end of which is forked to form arms 38 and 39 which are disposed in embracing relation to the plate 23. Journaled between the arms 38 and 39 is a roller 40 which extends through the slot 25. By this construction it will be apparent that as the plate 23 is moved back and forth the rack bar 37 will be reciprocated vertically.

Journaled in a bearing 41 carried by the rear member 17 is a shaft 42 which extends through the rear member 17 and has fixed on the end thereof disposed exteriorly of the casing A a signal arm 43. Fixed on the end of the shaft 42 which is disposed within the casing A is a pinion 44 which meshes with the teeth of the rack bar 37. The signal arm 43 is so positioned on the shaft 42 that when the rack bar 37 is in its normal or uppermost position said signal arm will be disposed in non-indicating position.

Journaled in the side members of the casing A and in a bracket 45 is a shaft 46 upon which is mounted a governor 47 including a disk 48 slidable on the shaft 46 as the usual weight elements of the governor are moved away from and toward the shaft 46 in the well known manner. Mounted on the side member 19 is a bracket 49 upon which is pivotally mounted a latch 50, one end of said latch overlying the inner side of the disk 48 while the other end thereof is adapted to engage in a notch 51 formed in the rack bar 37 when said bar is in its lowermost position. A spring 52 constantly tends to maintain the latch 50 in engagement with the notch 51. The shaft 46 is connected to a pinion 53 by means of a flexible shaft 54 and this pinion 53 meshes with a pinion 55 fixed upon the rear axle 10. By this construction it will be apparent that the rotation of the axle 10 will effect a rotation of the shaft 46.

Assuming the automobile to be traveling and the parts of the device in their normal position it will be apparent that upon operating the brake lever 13 the plate 23 will be moved forward and such movement of the plate 23 will draw the rack bar 37 downwardly so as to rotate the shaft 42 and move the signal arm from non-indicating to horizontal position to indicate that the automobile is stopping. As the automobile stops the disk 48 will be moved toward the side member 19 and release the latch 50 for engagement in the notch 51 whereby the rack bar 37 is locked against upward movement. As soon as the lever 13 is operated to release the brake the roller 32 will move rearwardly, but as the rack bar 37 is locked against movement by the latch 50 no movement can be imparted to the plate 23 by the spring 24. As soon as the automobile starts rotation will set up in the shaft 46 and the governor 47 will draw the disk 48 toward the side member 20 which will result in the disengagement of the latch 50 from the notch 51 when the various parts of the device will return to their normal position under the influence of the movement of the plate 23 operated by the spring 24.

It will be noted that the inner end of the signaling arm 43 is enlarged as at 60 and has mounted therein lenses 61 and 62 adapted to be brought into alinement with a lamp 63 mounted upon the rear member 17. The lenses 61 and 62 are of different colors, the lens 62 being alined with the lamp 63 when the arm 43 is in signaling position while the lens 61 is alined with said lamp when the arm is in non-signaling position. In this manner the position of the arm 43 can be readily determined at night.

There is mounted on the rear wall 17 of the casing A a bell which is adapted to be engaged by a clapper 65 carried by the arm 43 when said arm is moved to signaling position for the purpose of additionally warning drivers of vehicles following of prospective danger.

What is claimed is:—

In a signal for automobiles, the combination of a brake lever, a rotatable signal arm, means for normally holding said signaling arm in non-indicating position, means operated by the actuation of the brake lever to apply the brake for rotating said arm to signaling position, means for locking said arm against movement to non-indicating position, and means operated by subsequent movement of the automobile for releasing said locking means to permit movement of the arm to non-indicating position.

In testimony whereof, I affix my signature, in the presence of two witnesses.

HARRY K. HODGEBOOM.

Witnesses:
SAUL STECKER,
CLARENCE PINE.